July 7, 1959
H. F. CULLENDER
2,893,259
VALVE ACTUATING DEVICE
Filed Oct. 22, 1957
3 Sheets—Sheet 1
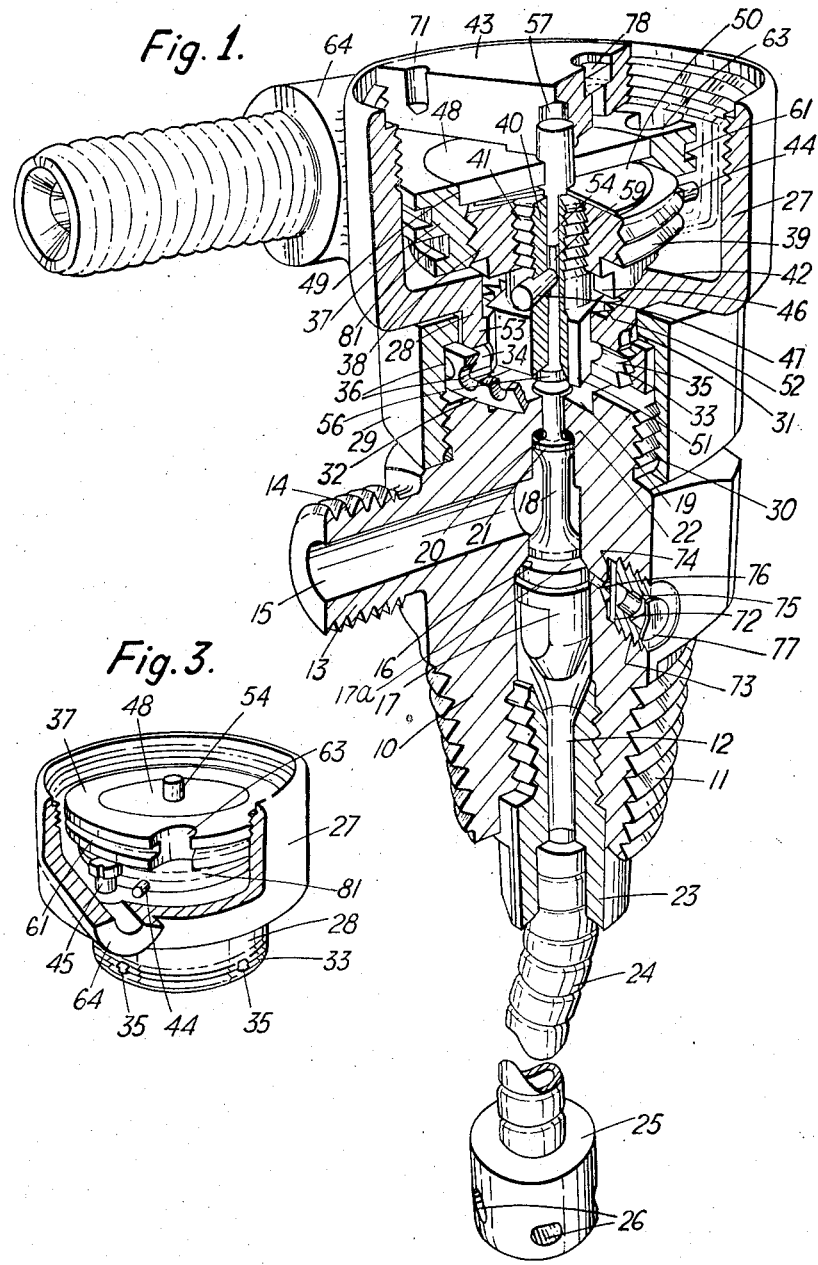
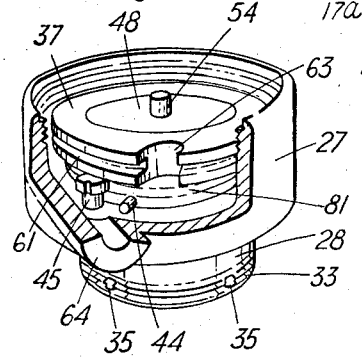
Inventor
HENRY FRANCIS CULLENDER
By
Aaron R. Townshend  Attorney July 7, 1959  H. F. CULLENDER  2,893,259
VALVE ACTUATING DEVICE
Filed Oct. 22, 1957  3 Sheets-Sheet 3

Inventor
HENRY FRANCIS CULLENDER
By
Aaron R. Townshend Attorney

United States Patent Office 2,893,259
Patented July 7, 1959

2,893,259

VALVE ACTUATING DEVICE

Henry Francis Cullender, London, England, assignor to Sparklets Limited, a British company Application October 22, 1957, Serial No. 691,586

2 Claims. (Cl. 74—424.8)

This invention relates to a valve actuating device.

In valve arrangements for the control of the flow of fluid under pressure, in which a valve body is held onto its seating by the pressure of fluid and is moved away from its seating to release the fluid by axial movement of a valve spindle carried by the valve body, it is found that considerable force is required to effect the initial opening of the valve against the full pressure of the fluid. As soon as the valve is opened sufficiently to permit fluid to flow round the valve, such fluid will apply a counter pressure to the valve member, so that the force required to effect further opening of the valve is considerably reduced.

The necessity to exert a considerable force to initiate opening of the valve is in many cases a considerable disadvantage. A particularly important case is in the release of compressed gas from a cylinder for the inflation of an inflatable dinghy or like life-saving equipment. In this case, the need to exert considerable force is particularly undesirable, since in an emergency it may be necessary for the valve means to be operated by a woman or child or by a person enfeebled by cold or injury.

It is an object of the present invention to provide an actuating device by the use of which the initial opening of the valve can be effected without the exertion of any great force.

According to the present invention, a device for actuating an axially movable valve spindle comprises a rotatable actuating member, an actuated member adapted on axial movement thereof to move the valve spindle, an intermediate member coupled to the actuating member and the actuated member by screw threads, means for restricting angular freedom of movement between the intermediate member and one of said other members, and means for preventing rotational movement of the actuated member whilst permitting axial movement thereof, the arrangement being such that rotational movement of the actuating member is translated into axial movement of the actuated member in such manner as to provide during initial movement of the actuating member a large mechanical advantage between the actuating and the actuated members and thereafter a lesser mechanical advantage.

In one form of the invention, the intermediate member is coupled to the actuating member through a screw thread of relatively coarse pitch and to the actuated member through a screw thread of the same hand but of considerably finer pitch, angular movement of the intermediate member with respect to the actuated member being restricted. With such an arrangement, the rotational movement of the actuating member is initially converted into axial movement of the actuated member through the finer thread with a correspondingly large mechanical advantage, which reduces the force that it is necessary to exert to rotate the actuating member in order to open the valve. The rate of axial travel of the actuated member will, of course, be correspondingly small. When further angular movement of the intermediate member is stopped, the rotational movement of the actuating member is converted into axial movement of the actuated member through the coarser thread with a corresponding reduction in the mechanical advantage gained and a corresponding increase in the travel of the actuated member.

The use of an initial large mechanical advantage followed by a decreased mechanical advantage, in accordance with the invention, not only ensures that only a moderate force is needed to rotate the actuating member to initiate opening of the valve, but also, since the speed of axial movement of the actuated member increases as the mechanical advantage is reduced, for a constant rate of rotation of the actuating member leads to a wider opening of the valve for a given angular movement of the actuating member than if the initial high mechanical advantage were maintained throughout the operation. This fact may be of importance in the inflation of life saving equipment, where it is often desirable to limit the rotation of the actuating member to a single turn, in order to enable operation to take place without difficulty and also to permit rapid and easy resetting of the actuating device after use, and yet, where carbon dioxide gas is used as the inflating medium, a wide opening of the valve is essential to prevent solidification of the carbon dioxide in and consequent blockage of the valve opening.

The means for restricting the angular freedom of movement between the intermediate member and the actuated movement may comprise two stops formed on the intermediate member and cooperating with a pin carried by the actuated member to permit angular movement of the intermediate member only through the angle between the stops.

The invention will now be more particularly described with reference to the accompanying drawings in which:

Figure 1 is a perspective view of one form of actuating device according to the invention mounted in position on valve means for controlling the release of compressed carbon dioxide gas from a cylinder to effect the inflation of an inflatable dinghy, parts being cut away to show the construction and mode of operation of the device;

Figure 3 is a perspective view of the actuating device of Figure 1, the cap and locking nut being removed and part of the wall of the housing being cut away.

Figure 2:
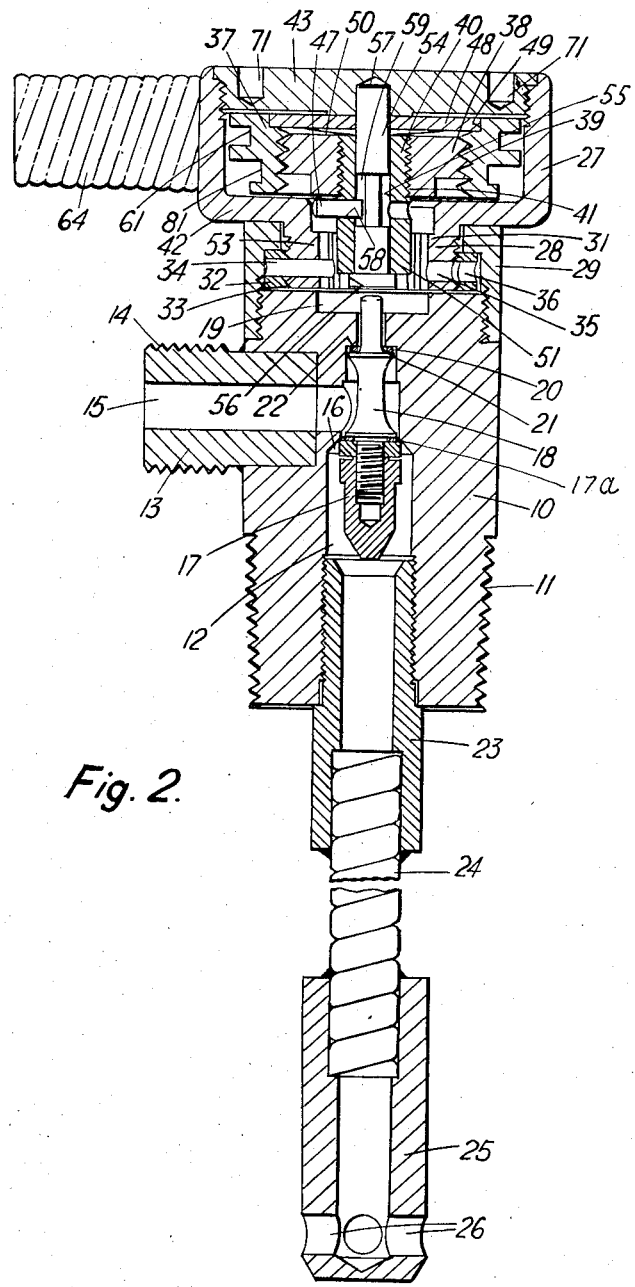
Figure 2 is a longitudinal section of the device and valve means of Figure 1.

Referring to Figures 1 and 2, the valve means comprises a substantially cylindrical valve body 10 having an external screw thread 11 for connection to the neck of the carbon dioxide cylinder (not shown). The valve body 10 is provided with an axial bore 12 serving as a gas inlet passage and has a projecting side arm 13 externally threaded at 14 for connection to the dinghy, usually by means of a flexible connection (not shown), the side arm 13 itself being axially bored at 15 to meet the axial bore 12 of the valve body 10 to provide a gas outlet. The bore 12 of the valve body 10 is constricted immediately upstream of its junction with the bore 15 to define an annular valve seat 16. A valve member 17 located within the part of the bore 12 forming the gas inlet passage has a portion 17a of resilient material which co-operates with the valve seat 16 to control the flow of gas from the gas inlet to the gas outlet passage. The valve member 17 is held with the portion 17a in contact with the seat 16 to close the valve when the valve means is connected to the gas cylinder by the pressure of the gas therein. The valve member 17 carries a valve spindle 18 which passes through the annular seating 16 and thence through the continuation of the bore 12 beyond its junction with the bore 15, the end of the valve spindle 18 terminating within an axial recess 19 formed in the end wall of the valve body 10. Leakage of gas between the valve spindle 18 and the wall of the bore 12 when the valve is open is prevented by a sealing ring 20 located between a shoulder 21 on the valve spindle 18 and a shoulder 22 in the wall of the bore 12.

The end of the bore 12 which in use is screwed into the neck of the carbon dioxide cylinder is threaded to receive an axially bored plug 23 into the other end of which is fitted a flexible tube 24 terminating in a hollow weight 25. The walls of the weight 25 are provided with apertures 26. In use, the weight 25 will always rest below the surface of the liquid carbon dioxide in the cylinder and will thus ensure that only liquid passes through the apertures 26 into the tube 24 and thence to the bore 12. In this way, the possibility of blockage of the valve by solid carbon dioxide which would be likely to occur if carbon dioxide gas were introduced into the valve means, is minimised. In addition, the rate of flow of gas to the dinghy is thereby increased.

The actuating means for the valve spindle 18 is contained within a cylindrical housing 27, open at one end and having a dependent portion 28 of open-ended cylindrical form and of reduced diameter at the other end. This portion 28 is rotatably connected to the valve body 10 by means of a nut 29 screwed onto an external thread 30 formed on the end of the valve body 10 remote from the gas inlet. The nut 29 has an internal flange 31 between which and the end wall of the valve body is housed a collar 32 in such manner that the collar 32 can rotate freely within the nut 29. The collar 32 is internally threaded to engage an external thread 33 on the end of the dependent portion 28 of the housing 27 and is locked by a pin 34 passing through one of a series of circumferentially spaced holes 35 in the portion 28 into one of a series of circumferentially spaced holds 36 in the collar 32. The pin 34 is held in position by the actuating mechanism as hereinafter described. The fact that the portion 28 of the housing 27 can rotate freely within the nut 29 when the latter is screwed to the valve body 10, ensures that the operation of the actuating device can be effected from any point through an angle of 360° about the main axis of the device.

The actuating mechanism comprises an annular pulley 37, serving as the actuating member, an annular bush 38, threadedly mounted within the pulley 37 by a screw thread 39 of relatively coarse pitch, serving as the intermediate member, and a core 40 threadedly mounted within the bush 38 by a screw thread 41 of substantially finer pitch than that of the thread 39 and of the same hand. One face of the pulley 37 abuts against a shoulder 42 formed between the main cylindrical body of the housing 27 and its dependent portion 28. Axial movement of the bush 38 within the pulley 37 is limited by a stop plate 48 fixed into a recess 49 on the face of the pulley 37 adjacent the cap 43. Between the stop plate 48 and the bush is located a spring washer 50. The stop plate 48 also bears during operation against an annular projection on the inner face of a screwed cap 43 closing the open end of the housing 27, so that while the pulley 37 is free to revolve, any appreciable axial movement thereof is prevented. The extent to which the pulley 37 can revolve is restricted to slightly under one complete revolution by a pin 44 carried by the pulley which contacts a stop in the form of a screw 45 mounted in and projecting from the shoulder 42 (Figure 3).

Rotation of the bush 38 with respect to the core 40 is restricted to slightly over half a revolution by cutting away a part of the bush to provide two shoulders 46, between which can move a pin 47 carried by the core, as hereinafter described.

Rotation of the core 40 is prevented by forming the end 51 of the core adjacent the valve stem 18 of square section, the corners of the square engaging with splines or serrations 52 formed on the inner periphery of an inwardly directed flange 53 at the end of the dependent portion 28 of the housing 27.

Axial movement of the core 40 operates to move the valve spindle 18 through a stem 54 adapted for limited sliding motion within an axial bore 55 in the core 40. The end of the stem 54 adjacent the valve spindle 18 projects beyond the end wall of the core 40 and is formed with a flange 56 abutting against the wall of the core 40, to prevent axial movement of stem 54 with respect to the core 40 in the direction away from the valve. The outer face of the stem 54 is arranged to abut against the end of the valve spindle 18. The other end of the stem 54 passes through apertures in the spring washer 50 and the stop plate 48 and projects beyond the latter into a recess 57 formed in the inner face of the cap 43.

Axial movement of the stem 54 with respect to the core in the direction towards the valve is limited by the end of the pin 47 which is arranged to pass through a hole 58 in the core 40, the ends of the pin 47 projecting on either side. The inner end of the pin 47 abuts against the shoulder of a peripheral groove 59 cut in the surface of the stem 54. The outer end of the pin 47 works between the shoulders 46 to limit rotational movement of the bush 38 with respect to the core 40, as hereinbefore described. The pin 47 is held in position by the inner wall of the portion 28 of the housing 27.

The end 51 of the core 40 is arranged to be so spaced from the pin 34 locking the collar 32 to the portion 28 of the housing 27 that the pin 34 cannot be withdrawn until the core 40 has been removed.

Figure 4:
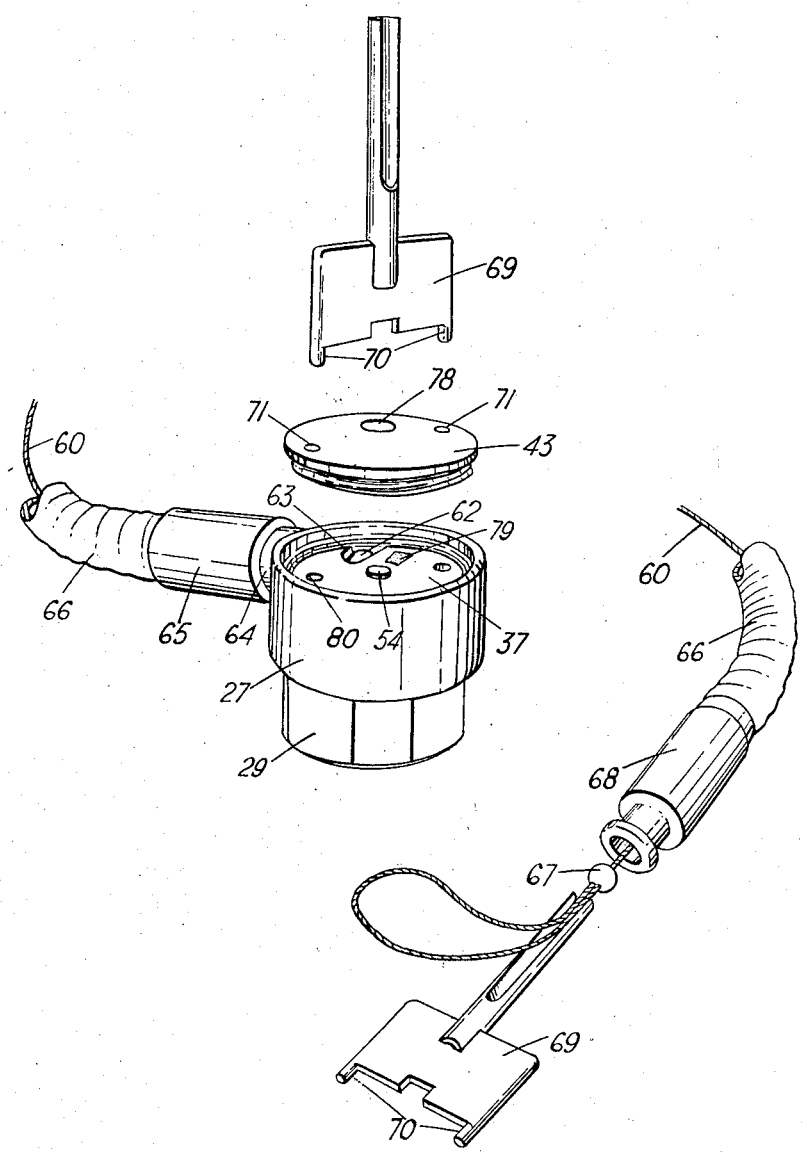
Figure 4 is a perspective view of the actuating device of Figure 1, the cap being displaced, and showing the operating means for the device in position thereon.

The pulley 37 is adapted to be operated by pulling a cable 60 (Figure 4), running in a peripheral groove 61. The cable 60 is removably fixed to the pulley 37 by means of a ball 62 attached to the end of the cable, which fits loosely into a recess 63 in the periphery of the pulley 37. The cable 60 after passing around the pulley 37 is led out of the housing through an outlet passage 64, the axis of which is tangential to the periphery of the pulley 37. The outer end of the outlet passage 64 is externally threaded to receive a connector 65 mounted on one end of a flexible conduit 66, which houses the cable 60 throughout the greater part of its length. The conduit 66 permits the device to be operated through a wide angular range normal to the axis of the device without danger of impeding its smooth action. Since the actuating device of the present invention is arranged to be operated with a relatively low initial pull on the cable 60, friction means are provided between the cable 60 and the end of the conduit 66 remote from the device to impose a slight impedance to the pulling of the cable 60 and thus to minimise the risk of accidental operation of the device. The friction means comprises a metal ball 67 mounted at a suitable point on the cable and adapted to be inserted into a tubular member 68 mounted on the end of the conduit and to be gripped by a ring of rubber or like resilient material mounted therein (not shown). The ball 67 is inserted by means of a special key, shown at 69 in Figure 4. This key is also used to unscrew the cap 43, and for this purpose is provided with spaced prongs 70 adapted to be inserted in holes 71 in the outer face of the cap 43.

In order to obviate any danger of a build-up of excess pressure within the carbon dioxide cylinder from any cause, such as, for example, heating of the cylinder walls, which may cause damage to the valve means or bursting of the cylinder, means for releasing such excess pressure are provided. The means comprises a bursting disc 72 housed within a recess 73 formed in the outer wall of the valve body 10 between an annular washer 74 and a bored plug 75 screwed into the recess 73. The inner end of the recess 73 communicates through a passage 76 with the bore 12 upstream of the valve. A disc 77 of coloured plastic is arranged to close the outer end of the bore in the plug 75, disruption of the plastic disc 77 thus indicating that the bursting disc 72 has ruptured.

Visual means are also provided to indicate that the actuating means has been operated. This comprises an aperture 78 in the cap 43 through which a coloured spot 79 in the upper surface of the pulley 37 which is arranged to be of contrasting colour is visible when the actuating means is set and ready for operation. A small rotation of the pulley will move the spot 79 so that the background colour is visible through the aperture 78.

In order to facilitate re-setting of the device after operation, holes 80 are provided in the upper surface of the pulley, the holes being spaced to receive the prongs 70 of the key 69.

In operation, the actuating device is set by removing the cap 43, turning the pulley 37 by means of the key 69 until the recess 63 is opposite the outlet 64, inserting the ball 62 on the end of the cable 60 through the conduit 66 and into the recess 63, and winding the pulley 37 in the reverse direction to its operational movement until the pin 44 abuts against the screw 45. The ball 67 is inserted by means of the key 69 into the tubular member 68 until it is gripped by the rubber ring. The cap 43 is then replaced. The device is now ready for operation.

When it is desired to inflate the dinghy, the actuating mechanism is operated by pulling the end of the cable 61 to rotate the pulley 37. Initially owing to the difference in pitch between the screw threads 39 and 41, the pulley 37 and the bush 38 rotate together about the core 40. Since the core 40 is prevented from rotating by its square end 51 and the serrations 52, it is forced to move axially on the finer screw thread 41 carrying with it the stem 54 which in turn moves the valve spindle 18 to move the valve member 17 off its seat 16. After the bush 38 has made a restricted rotation about the core, corresponding to the angular distance between the shoulders 46, further rotation is prevented by the pin 47 abutting against one of the shoulders 46. The pulley 37 thereafter rotates through the remainder of its travel about the stationary bush 38 and core 40 which are prevented from rotating and thus move axially on the coarser screw thread 39. Thus the initial movement of the valve stem 18 is effected through the fine screw thread 41 at a high mechanical advantage to reduce the pull required on the cable 61, whilst the later movement of the valve stem 18 is effected through the coarser thread 39 at a much lower mechanical advantage but with greater axial movement, thus ensuring complete opening of the valve within a single revolution of the pulley 37.

It will be noted that when the pulley 37 has completed its revolution, the recess 63 is opposite the opening of the outlet 64, so that the ball 62 attached to the end of the cable 61 is freed and is withdrawn through the outlet 64 and conduit 66. This complete freeing of the cable 61 is an indication that complete opening of the valve has been attained.

The actuating mechanism is so arranged that, while it can easily be disassembled for adjustment or cleaning when required, this can only be done by the use of a special tool so that it is difficult for unauthorised persons to tamper with the mechanism. This is effected by means of the stop screw 45, which is also used to secure the pulley 37 in position. The head of the screw 45 is arranged to lodge within a peripheral groove 81 on the pulley 37. The screw 45 is so formed that it can only be removed by the use of the special tool.

When it is desired to disassemble the actuating means, the cap 43 is removed, the pulley 37 is rotated until the recess 63 is directly above the screw 45, so that access to the screw can be obtained through the recess, and the screw 45 removed with the special tool. The actuating mechanism can now be removed as a whole from the housing 27. The pin 47 is withdrawn, when the stem 54 can be withdrawn from the core 40 and the core itself unscrewed from the bush 38. The bush is then unscrewed from the pulley 37. The removal of the core 40 allows the locking pin 34 holding the collar 32 to the portion 28 to be withdrawn thus permitting removal of the nut 29.

A particular advantage of the actuating device of the present invention is that, since the actuating device may be arranged for free rotation about the valve body and the cable may be provided with a flexible conduit as hereinbefore described, the device may be operated from any point about the axis of the valve body and over a wide angular range about a plane normal to this axis.

It will be appreciated that while the operating cable may be pulled manually to operate the device, the cable may alternatively be fixed to the ship or aircraft carrying the dinghy so that the actuating device is automatically operated when the dinghy is thrown overboard.

I claim:

1. A valve actuating device comprising a rotatable actuating member, an intermediate member coupled to said actuating member by a screw thread of relatively coarse pitch, an actuated member coupled to said intermediate member by a screw thread of substantially finer pitch than said first-mentioned screw thread and arranged for axial movement, means for preventing rotation of said actuated member during the axial movement thereof, and means for preventing rotation of said intermediate member after a predetermined initial angular movement of said actuating member, whereby rotational movement of said actuating member is translated into axial movement of said actuated member so as to provide during said predetermined initial angular movement of said actuating member a large mechanical advantage between said actuating member and said actuated member and thereafter a lesser mechanical advantage.

2. A valve actuating device comprising a rotatable actuating member, an intermediate member coupled to said actuating member by a screw thread of relatively coarse pitch, an actuated member coupled to said intermediate member by a screw thread of substantially finer pitch than said first-mentioned screw thread and arranged for axial movement, means for preventing rotation of said actuated member during the axial movement thereof, and second means for preventing rotation of said intermediate member after a predetermined initial angular movement of said actuating member, said second means comprising two stops formed on said intermediate member and a pin carried by said actuated member and working between said stops, whereby rotational movement of said actuating member is translated into axial movement of said actuated member so as to provide during said predetermined initial angular movement of said actuating member a large mechanical advantage between said actuating member and said actuated member and thereafter a lesser mechanical advantage.

References Cited in the file of this patent

UNITED STATES PATENTS

| Number | Name | Date |
|---|---|---|
| 847,870 | Young | Mar. 19, 1907 |
| 2,351,211 | Hodgson | June 13, 1944 |
| 2,538,787 | Manhartsberger | Jan. 23, 1951 |